(12) United States Patent
Peeters

(10) Patent No.: US 12,433,831 B2
(45) Date of Patent: Oct. 7, 2025

(54) SILICONE ALTERNATIVES

(71) Applicant: Oleon NV, Evergem (BE)

(72) Inventor: Hilde Peeters, Keerbergen (BE)

(73) Assignee: Oleon NV, Evergem (BE)

( * ) Notice: Subject to any disclaimer, the term of this patent is extended or adjusted under 35 U.S.C. 154(b) by 306 days.

(21) Appl. No.: 17/265,907

(22) PCT Filed: Aug. 8, 2019

(86) PCT No.: PCT/EP2019/071311
§ 371 (c)(1),
(2) Date: Feb. 4, 2021

(87) PCT Pub. No.: WO2020/035387
PCT Pub. Date: Feb. 20, 2020

(65) Prior Publication Data
US 2021/0161794 A1   Jun. 3, 2021

(30) Foreign Application Priority Data
Aug. 13, 2018 (EP) .................................. 18188686

(51) Int. Cl.
*A61K 8/73* (2006.01)
*A61K 8/04* (2006.01)
(Continued)

(52) U.S. Cl.
CPC .............. *A61K 8/731* (2013.01); *A61K 8/042* (2013.01); *A61K 8/342* (2013.01); *A61K 2800/43* (2013.01); *A61K 2800/805* (2013.01)

(58) Field of Classification Search
CPC ........ A61K 8/731; A61K 8/042; A61K 8/342; A61K 2800/43; A61K 2800/805;
(Continued)

(56) References Cited

U.S. PATENT DOCUMENTS

| 2006/0019848 A1* | 1/2006 | Luo | .......................... A61Q 1/06 510/130 |
| 2010/0190864 A1 | 7/2010 | Ohmori et al. | |

(Continued)

FOREIGN PATENT DOCUMENTS

| CN | 104114234 A | 10/2014 |
| CN | 105636576 A | 6/2016 |

(Continued)

OTHER PUBLICATIONS

JOLEE 7202; (shop.oleonhealthandbeauty.com/propylene-glycol-diheptanoate-jolee-7202) (Year: 2021).*
(Continued)

*Primary Examiner* — Bethany P Barham
*Assistant Examiner* — Janet Joseph
(74) *Attorney, Agent, or Firm* — ArentFox Schiff LLP

(57) ABSTRACT

The present invention relates to a product, its use to increase viscosity of low viscosity silicone alternatives, and to the resulting compositions and their use as silicone alternatives. The product according to the invention comprises an alcohol comprising at least 36 carbon atoms and which is liquid at 25° C. and atmospheric pressure, and an ethyl cellulose polymer.

13 Claims, 1 Drawing Sheet

Figure 1:
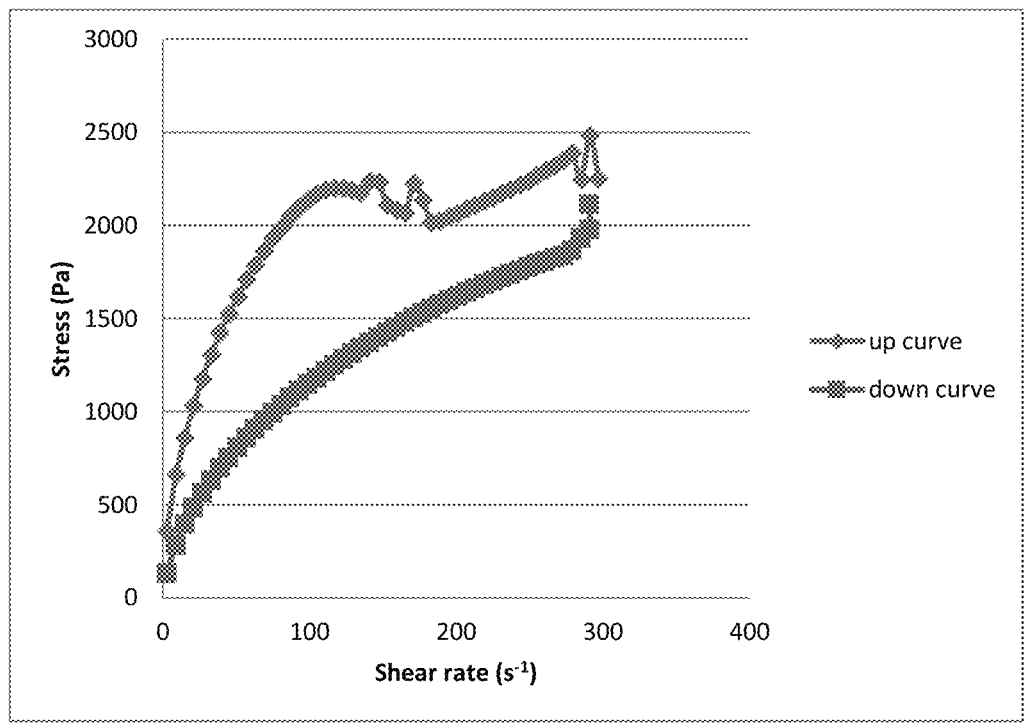

(51) Int. Cl.
*A61K 8/34* (2006.01)
*A61K 8/37* (2006.01)
*A61K 8/92* (2006.01)
*A61Q 5/00* (2006.01)
*A61Q 19/00* (2006.01)

(58) Field of Classification Search
CPC . A61K 8/92; A61K 8/37; A61Q 19/00; A61Q 5/00
See application file for complete search history.

(56) References Cited

U.S. PATENT DOCUMENTS

| | | | |
|---|---|---|---|
| 2013/0053353 A1* | 2/2013 | Tamarkin | A61K 47/10 514/159 |
| 2014/0356303 A1 | 12/2014 | Burgo et al. | |
| 2016/0199286 A1* | 7/2016 | Mary Kay | A61K 8/42 424/68 |
| 2017/0172904 A1 | 6/2017 | Page et al. | |

FOREIGN PATENT DOCUMENTS

| | | | | |
|---|---|---|---|---|
| EP | 3187166 A1 | * | 7/2017 | ............... A61K 8/85 |
| JP | 4656367 B2 | | 3/2011 | |
| WO | WO-2015014789 A1 | * | 2/2015 | ............. A61K 8/342 |
| WO | WO-2018024499 A1 | * | 2/2018 | |

OTHER PUBLICATIONS

Okamoto, Toru, et al. Preparation and Thermal Properties of Fatty Alcohol/ Surfactant/ Oil/ Water Nanoemulsions and their Cosmetic Applications, Journal of Oleo Science, vol. 65, No. 1, Jan. 1, 2016, pp. 27-36.

International Search Report and Written Opinion for PCT/EP2019/071311, dated Oct. 18, 2019, 12 pages.

* cited by examiner

SILICONE ALTERNATIVES

CROSS-REFERENCE TO RELATED APPLICATIONS

This application is a National Stage of PCT/EP2019/071311, filed Aug. 8, 2019, which claims priority to European Patent Application No. 18188686.2, filed Aug. 13, 2018, the disclosures of which are hereby incorporated by reference in their entireties.

The present invention relates to a product, its use to increase viscosity of low viscosity silicone alternatives, resulting compositions and their use as silicone alternatives.

Silicones, or polysiloxanes, are widely used in cosmetics because of their very good skin feel and spreading properties. Also, they are particular suitable in cosmetic compositions, such as for skin and hair products.

A large variety of silicones is available, from low viscosity silicones, whose viscosity is lower than 50 mPa·s, to medium to high viscosity silicones, whose viscosity ranges from 50 mPa·s to 100 000 mPa·s. Their use depends on the end-product.

However, there are some concerns with the use of silicones in cosmetics, especially when applied on the skin, as silicones could easily penetrate the skin.

Also, many alternatives have been developed during last years. However, it appears that the available alternatives mainly replace low viscosity silicones, whose viscosity does not exceed 50 mPa·s, even most often does not exceed 20mPa·s.

There is still a need to find an alternative to silicones whose viscosity is of at least 50 mPa·s, that exhibits the benefits of silicones, while avoiding their disadvantages.

In particular, it would be interesting to find a safe alternative, acceptable in cosmetics, which fulfills the following properties:
good skin feel,
good spreading, and
large range of viscosity.

Surprisingly, it was found that a combined preparation of an alcohol with an ethyl cellulose polymer could increase the viscosity of some low viscosity silicone alternatives.

Indeed, although ethyl cellulose polymer is hydrophobic, it does not mean it solubilizes in any organic phase. In particular, it is difficult to get it solubilized in some low viscosity silicone alternatives, such as isoamyl laurate and propylene glycol diheptanoate, commercial low viscosity silicone alternatives with very good skin feel and spreading properties.

The product of the invention does solubilize into low viscosity silicone alternatives and thus gives access to a wide range of viscosity at 25° C. and at zero shear rate, from medium to high viscosities, in particular from 50 to 100 000 mPa·s, more particularly from 50 to 5000 mPa·s.

The present invention therefore relates to a product comprising an alcohol comprising at least 36 carbon atoms and which is liquid at 25° C. and atmospheric pressure and an ethyl cellulose polymer, as a combined preparation for simultaneous or separate use.

The product according to the invention is a juxtaposition of separate but functionally interacting individual components, a specific alcohol and an ethyl cellulose polymer ("kit-of-parts").

The alcohol comprising at least 36 carbon atoms and which is liquid at 25° C. and atmospheric pressure may comprise one or more hydroxyl groups, such as one or two, or three hydroxyl groups.

Preferably, the alcohol consists only of carbon, hydrogen and oxygen atoms.

Preferably, the alcohol is a branched alcohol. In particular, the alcohol is chosen from the group consisting of Guerbet alcohols, dimer diols and/or poly(dimer diol).

A Guerbet alcohol is a branched alcohol, obtained by a Guerbet reaction comprising dehydrogenation and condensation of one or more primary alcohol(s).

A dimer diol is a mixture of cyclic and noncyclic isomers, known by the skilled person. It is usually obtained by:
dimerization of unsaturated fatty acid(s) or ester(s) thereof followed by reduction of respectively acid or ester groups into hydroxyl groups, or
dimerization of unsaturated fatty alcohol(s).

Advantageously, unsaturated fatty acid(s) or ester(s) thereof and unsaturated fatty alcohol(s) are respectively mono carboxylic acid(s) or ester(s) and mono alcohol(s), each hydrocarbon chain of fatty acid(s) or fatty alcohol(s) comprising between 18 and 24, preferably between 18 and 22 carbon atoms. Also, dimer diol molecules preferably comprise between 36 and 48, more preferably between 36 and 44 carbon atoms.

In the present application, unless otherwise indicated, all ranges of values used are to be understood as being inclusive limits.

Preferably, the dimer diol comprises more than 50% by weight, more preferably more than 70% by weight of noncyclic isomers, percentages by weight being given on the total weight of the dimer diol. By total weight of the dimer diol, it is intended the weight of all dimer diol molecules.

A poly(dimer diol) is a polymerized dimer diol, which usually results as a by-product during the preparation of the dimer diol. It comprises at least two dimer diol units linked by an ether function. The degree of polymerization preferably varies from 2 to 5, more preferably from 2 to 3.

Preferably, poly(dimer diol) molecules comprise between 72 and 96, more preferably between 72 and 88 carbon atoms.

The poly(dimer diol) may be a mixture of poly(dimer diol) molecules with different degree of polymerization. Preferably, the poly(dimer diol) comprises at least 50% by weight of a poly(dimer diol) molecules with a degree of polymerization of 2, percentages by weight being given on the total weight of the poly(dimer diol). In particular, the poly(dimer diol) comprises at least 50% by weight of poly(dimer diol) molecules comprising 72 carbon atoms, percentages by weight being given on the total weight of the poly(dimer diol). By total weight of the poly(dimer diol), it is intended the weight of all poly(dimer diol) molecules.

In the product of the invention, a mixture of alcohols comprising at least 36 carbon atoms and which is liquid at 25° C. and atmospheric pressure can be used.

Preferably, the alcohol comprising at least 36 carbon atoms is liquid at 23° C., more preferably at 20° C., and atmospheric pressure.

Preferably, the alcohol comprising at least 36 carbon atoms and which is liquid at 25° C. and atmospheric pressure, comprises no more than 144, more preferably no more than 88, even more preferably no more than 72 carbon atoms. Preferably, the alcohol comprises 36 carbon atoms. In particular, it is chosen from the group consisting of Guerbet alcohols prepared from stearic alcohol and/or isostearic alcohol, and dimer diol prepared from oleic acid or oleic alcohol. Advantageously, the alcohol is a dimer diol prepared from oleic acid or oleic alcohol.

An ethyl cellulose polymer is a derivative of cellulose, wherein some hydroxyl groups on the repeating glucose units are converted into ethoxyl groups. In particular, the ethyl cellulose polymer is of formula (I):

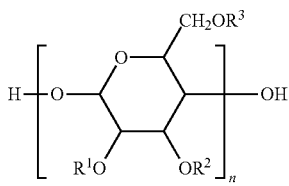

(I)

wherein
R$^1$, R$^2$ and R$^3$, identical or different, represent H or CH$_2$CH$_3$, and
n, an integer, is of at least 2.

In commercial available ethyl cellulose polymers, ethoxyl content ranges from 45 to 51%, preferably from 48 to 49.5% by weight, based on the weight of ethyl cellulose polymer. Ethyl cellulose polymers are characterized by their viscosity at 25° C. when they are diluted at a concentration of 5% by weight on the weight of a solution comprising a 80:20 mixture of toluene:ethanol (wt/wt). Ethyl cellulose polymers having a viscosity comprised between 4 mPa·s and 350 mPa·s can be used in the present invention, preferably, ethyl cellulose polymers having a viscosity comprised between 7 mPa·s and 200 mPa·s, more preferably, ethyl cellulose polymers having a viscosity comprised between 45 mPa·s and 100 mPa·s.

Alternatively, a mixture of ethyl cellulose polymers having different viscosity can be used.

In the product according to the invention, the weight ratio (alcohol comprising at least 36 carbon atoms and which is liquid at 25° C. and atmospheric pressure)/(ethyl cellulose polymer), is preferably comprised between 2 and 9999, more preferably between 6 and 499, even more preferably between 9 and 399.

Advantageously, the product of the invention is used to increase the viscosity of a liquid, preferably a hydrophobic liquid.

In a preferred embodiment, components of the product of the invention are used simultaneously, for example in the form of a preblend. The alcohol comprising at least 36 carbon atoms and which is liquid at 25° C. and atmospheric pressure and the ethyl cellulose polymer are first blended together to form a preblend. By "preblend", it is intended that the product according to the invention is under a premixed form.

Alternatively, in another embodiment, components of the product of the invention are used separately. The alcohol comprising at least 36 carbon atoms and which is liquid at 25° C. and atmospheric pressure and the ethyl cellulose polymer are individually and/or successively mixed with a third liquid component. The invention thus relates to a preblend comprising an alcohol comprising at least 36 carbon atoms and which is liquid at 25° C. and atmospheric pressure and an ethyl cellulose polymer.

In particular, the product according to the invention is a gel-like preblend.

By "gel-like preblend", it is intended a product of malleable consistency that lets the light pass through (translucent or transparent).

Ethyl cellulose polymer content may be as low as 0.01% by weight based on the weight of the preblend. According to the viscosity of the ethyl cellulose polymer and its content in the preblend, preblends with a large range of viscosity can be obtained. Dynamic viscosity of preblends at 25° C. and at zero shear rate, may vary from 2.5 to more than 3000 Pa·s. However, as the viscosity of preblends is going down with the temperature, it is possible to heat the more viscous preblends, preferably at a temperature of 80° C. or lower, to render them pourable, as shown in Example 1, point 1.4.

Preferably, the (gel-like) preblend comprises or consists of:
- 70-99.99%, preferably 80-99.9%, more preferably 85-99.8%, even more preferably 90-99.7% by weight of one or more alcohol(s) comprising at least 36 carbon atoms and which is liquid at 25° C. and atmospheric pressure, and
- 0.01-30%, preferably 0.1-20%, more preferably 0.2-15%, even more preferably 0.3-10% by weight of one or more ethyl cellulose polymer(s), weight percentages being based on the total weight of the (gel-like) preblend.

In a particularly preferred gel-like preblend, the alcohol comprising at least 36 carbon atoms and which is liquid at 25° C. and atmospheric pressure is a dimer diol prepared from oleic acid or oleic alcohol. Preferably, the ethyl cellulose polymer used in the particularly preferred gel-like preblend of the invention has a viscosity of 100 mPa·s (as defined above).

The gel-like preblends of the invention present some rheological properties. In particular, the gel-like preblends present shear-thinning and thixotropic properties.

By shear-thinning, it is intended a compound or a mixture of compounds whose viscosity decreases when it is subjected to increasing stress, such as shear rate. The shear-thinning property of different preblends is shown in Example 1, on Table 2.

By thixotropic, it is intended a compound or a mixture of compounds whose viscosity decreases when it is subjected to increasing shear rate, and whose viscosity is recovered when shear ceases. As shown in FIG. 1, when the shear rate applied to a gel-like preblend is reduced, the stress path lags forming a hysteresis loop and returns to a point lower than the initial shear stress value, which is characteristic of most thixotropic materials.

Gel-like preblends of the invention recover their initial viscosity and their gel-like texture after shear ceases.

The present invention also relates to a process for preparing a gel-like preblend comprising the following steps:
i) mixing an alcohol comprising at least 36 carbon atoms and which is liquid at 25° C. and atmospheric pressure, with an ethyl cellulose polymer to obtain a preblend;
ii) heating the preblend under stirring at a temperature higher than the glass transition temperature of the ethyl cellulose polymer; and
iii) cooling down the preblend under stirring to obtain a gel-like preblend.

The alcohol comprising at least 36 carbon atoms and which is liquid at 25° C. and atmospheric pressure, and the ethyl cellulose polymer are as described above, including preferential and advantageous features and embodiments.

Step ii) is preferably conducted until ethyl cellulose polymer is totally solubilized.

If more than one ethyl cellulose polymer is used, then step ii) is conducted at a temperature higher than the highest glass transition temperature.

In step iii), the preblend is preferably cooled down at a rate of 0.6° C./min or lower. This slow cooling down is controlled until reaching a temperature of 45° C., preferably until 40° C., more preferably until 35° C.

Advantageously, the alcohol comprising at least 36 carbon atoms and which is liquid at 25° C. and atmospheric pressure is a dimer diol or a poly(dimer diol). Gel-like preblends are then transparent. Preferably, the alcohol is a dimer diol prepared from oleic acid or oleic alcohol. The gel-like preblend then obtained is transparent, odorless and colorless. Also, gel-like preblends of the invention find advantageously applications in cosmetics, such as a shear-thinning thickening agent.

The invention concerns the use of the product of the invention, to increase the viscosity of a low viscosity silicone alternative chosen from the group consisting of isoamyl laurate, propylene glycol diheptanoate, isononyl isononanoate, trieptanoin, coco-caprylate/caprate, ethyl macadamiate, octyldodecyl olivate, diisoamyl sebacate, butylene glycol dicaprylate/dicaprate, isodecyl neopentanoate, methylheptyl isostearate, isodecyl neopentanoate, dicaprylyl ether, dicaprylyl carbonate, propylheptyl caprylate, and their mixture.

The alcohol comprising at least 36 carbon atoms and which is liquid at 25° C. and atmospheric pressure, and the ethyl cellulose polymer are as described above, including preferential and advantageous features and embodiments.

Low viscosity silicone alternatives are named according to the International Nomenclature of Cosmetic Ingredients (INCI).

Low viscosity silicone alternatives covered by the invention are all obtainable from renewable resources, especially from vegetable oils.

Preferably, the low viscosity silicone alternative is chosen from the group consisting of isoamyl laurate, propylene glycol diheptanoate, isononyl isononanoate, trieptanoin, coco-caprylate/caprate, ethyl macadamiate, octyldodecyl olivate, diisoamyl sebacate, and their mixture.

More preferably, the product of the invention is used to increase the viscosity of isoamyl laurate and/or propylene glycol diheptanoate.

In one embodiment, components of the product of the invention are used separately. An alcohol comprising at least 36 carbon atoms and which is liquid at 25° C. and atmospheric pressure and an ethyl cellulose polymer are individually and/or successively mixed with the low viscosity silicone alternative. In particular, the alcohol is first mixed with the low viscosity silicone alternative, then the ethyl cellulose polymer is mixed in.

In another embodiment, components of the product of the invention are used simultaneously. An alcohol comprising at least 36 carbon atoms and which is liquid at 25° C. and atmospheric pressure and an ethyl cellulose polymer are first blended together, preferably in the form of a gel-like preblend according to the process described above. The preblend or preferably the gel-like preblend is then mixed with the low viscosity silicone alternative.

As shown in Example 2, the alcohol comprising at least 36 carbon atoms and which is liquid at 25° C. and atmospheric pressure, and the ethyl cellulose polymer have poor effect individually and respectively on the viscosity of low viscosity silicone alternatives when mixed with said low silicone alternatives. While once combined, they allow an increased viscosity of the low viscosity silicone alternative after mixing, which viscosity is much higher than the sum of increased viscosity of each component individually mixed with the low viscosity silicone alternative. Moreover, the synergistic effect is higher when both components of the product of the invention are used simultaneously, in particular when both components are preblended and the resulting preblend presents the appearance of a gel.

A process for increasing the viscosity of a low viscosity silicone alternative chosen from the group consisting of isoamyl laurate, propylene glycol diheptanoate, isononyl isononanoate, trieptanoin, coco-caprylate/caprate, ethyl macadamiate, octyldodecyl olivate, diisoamyl sebacate, butylene glycol dicaprylate/dicaprate, isodecyl neopentanoate, methylheptyl isostearate, isodecyl neopentanoate, dicaprylyl ether, dicaprylyl carbonate, propylheptyl caprylate, and their mixture, comprises the step of mixing said low viscosity silicone alternative with the product of the invention, preferably with the (gel-like) preblend of the invention.

The invention relates also to a composition comprising or consisting of:
  a low viscosity silicone alternative chosen from the group consisting of isoamyl laurate, propylene glycol diheptanoate, isononyl isononanoate, trieptanoin, coco-caprylate/caprate, ethyl macadamiate, octyldodecyl olivate, diisoamyl sebacate, butylene glycol dicaprylate/dicaprate, isodecyl neopentanoate, methylheptyl isostearate, isodecyl neopentanoate, dicaprylyl ether, dicaprylyl carbonate, propylheptyl caprylate, and their mixture;
  an alcohol comprising at least 36 carbon atoms and which is liquid at 25° C. and atmospheric pressure; and
  an ethyl cellulose polymer.

Low viscosity silicone alternative, the alcohol comprising at least 36 carbon atoms and which is liquid at 25° C. and atmospheric pressure, and the ethyl cellulose polymer, are as described above, including preferential and advantageous features and embodiments.

In the composition according to the invention, the weight ratio (alcohol comprising at least 36 carbon atoms and which is liquid at 25° C. and atmospheric pressure)/(ethyl cellulose polymer), is preferably comprised between 2 and 9999, more preferably between 6 and 499, even more preferably between 9 and 399.

Preferably, the content of low viscosity silicone alternative ranges from 1 to 99% by weight based on the weight of the composition.

Preferably, the content of alcohol comprising at least 36 carbon atoms and which is liquid at 25° C. and atmospheric pressure and ethyl cellulose polymer, ranges from 1 to 99% by weight, preferably from 3 to 99% by weight based on the weight of the composition. In particular, the content of alcohol comprising at least 36 carbon atoms and which is liquid at 25° C. and atmospheric pressure, is at least 0.95%, preferably at least 1.5%, more preferably at least 2.5% by weight based on the weight of the composition.

Preferably, the content of ethyl cellulose polymer is at least 0.05%, preferably at least 0.1% by weight based on the weight of the composition.

In a preferred embodiment, the composition of the invention comprises or consists of:
  at least 40%, preferably at least 50% by weight of the low viscosity silicone alternative;
  at least 2.85%, preferably at least 5% by weight of the alcohol comprising at least 36 carbon atoms and which is liquid at 25° C. and atmospheric pressure; and
  at least 0.15%, preferably at least 0.3% by weight of the ethyl cellulose polymer.

The combination of an alcohol comprising at least 36 carbon atoms and which is liquid at 25° C. and atmospheric pressure, and an ethyl cellulose polymer, is able to modify the rheological properties of a low viscosity silicone alternative. Indeed, the composition according to the invention is shear-thinning, as shown in Example 3, point 3.2.

Advantageously, in the composition of the invention:
the low viscosity silicone alternative is chosen from the group consisting of isoamyl laurate, propylene glycol diheptanoate, and their mixture; and
the alcohol comprising at least 36 carbon atoms and which is liquid at 25° C. and atmospheric pressure is a dimer diol prepared from oleic acid or oleic alcohol.
Those specific compositions are transparent, odorless and colorless.

A particularly preferred composition of the invention comprises or consists of:
40-97% by weight of a low viscosity silicone alternative is chosen from the group consisting of isoamyl laurate, propylene glycol diheptanoate, and their mixture;
2.85-59.85% by weight of a dimer diol prepared from oleic acid or oleic alcohol
0.15-9% by weight of an ethyl cellulose polymer.

Preferably, in this particularly preferred composition, the weight ratio (dimer diol prepared from oleic acid or oleic alcohol)/(ethyl cellulose polymer), being comprised between 9 and 399.

Preferably, the ethyl cellulose polymer has a viscosity of 100 mPa·s (as defined above).

The invention also relates to a process for preparing a composition of the invention, by mixing the alcohol comprising at least 36 carbon atoms and which is liquid at 25° C. and atmospheric pressure, the ethyl cellulose polymer and the low viscosity silicone alternative.

The alcohol comprising at least 36 carbon atoms and which is liquid at 25° C. and atmospheric pressure, the ethyl cellulose polymer and the low viscosity silicone alternative, are as described above, including preferential and advantageous features and embodiments.

In a first embodiment, the process for preparing a composition according to the invention comprises the following steps:
i) mixing the low viscosity silicone alternative with the alcohol comprising at least 36 carbon atoms and which is liquid at 25° C. and atmospheric pressure;
ii) adding the ethyl cellulose polymer to the mixture prepared in step i), under stirring, to obtain a composition that is heated up to a temperature higher than glass transition temperature of the ethyl cellulose polymer;
iii) cooling down the composition under stirring.

In step ii), if more than one ethyl cellulose polymer is used, then the composition is heated at a temperature higher than the highest glass transition temperature. The composition is preferably maintained at this temperature until complete solubilization of ethyl cellulose polymer.

In a step iii), the temperature is cooled down preferably at a rate of 0.6° C./min or lower, until reaching a temperature of 45° C., preferably 40° C., more preferably 35° C.

In a second embodiment, the process for preparing a composition according to the invention comprises the following steps:
i) preparing a gel-like preblend according to the process described above;
ii) mixing the gel-like preblend with the low viscosity silicone alternative.

Preferably, in step ii), the temperature is at 80° C. or lower, more preferably at 60° C. or lower. The gel-like preblend may be at a temperature comprised between 40 and 60° C. Step ii) is preferably conducted until a homogeneous composition is obtained. Preferably, the gel-like preblend is added into the low viscosity silicone alternative.

The gel-like preblend solubilizes in low viscosity silicone alternatives as defined above without heating or with heating at a temperature of 80° C. or lower, which represents an advantage, especially for thermal sensitive low viscosity silicone alternatives.

Advantageously, in the compositions of the invention, the alcohol comprising at least 36 carbon atoms and which is liquid at 25° C. and atmospheric pressure is a dimer diol or a poly(dimer diol). Compositions are transparent. Preferably, the alcohol is a dimer diol prepared from oleic acid or oleic alcohol. Compositions obtained thereof are transparent and frequently colorless.

The invention concerns the use of the composition of the invention as a silicone alternative.

In particular, the composition is used as medium to high viscosity silicone alternative, more particularly as silicone alternative with a viscosity at 25° C. and at zero shear rate, ranging from 50 to 100000 mPa·s, preferably from 50 to 5000 mPa·s, more preferably from 60 to 3000 mPa·s.

In addition, the composition of the present invention is shear-thinning. Addition of an alcohol comprising at least 36 carbon atoms and which is liquid at 25° C. and atmospheric pressure, and an ethyl cellulose polymer, to a low viscosity silicone alternative, confers to the latter shear-thinning property (Example 3, Table 6). This is an additional advantage for the composition of the invention. Silicones are not shear-thinning.

The composition of the present invention can be used in cosmetic compositions.

Accordingly, the present invention also relates to a cosmetic composition comprising the product of the invention, or the composition of the invention, an active ingredient and/or a pigment or a colorant.

The composition of the invention can be used in an amount of 1 to 99% by weight, preferably 2 to 75% by weight, more preferably 3 to 60% by weight, based on the weight of the cosmetic composition.

The cosmetic composition can be in the form of a liquid in different viscosity range, a water-in-oil emulsion, a gel or a solid.

The cosmetic composition can be a makeup, a skin product, or a hair product, such as an eye shadow, a lipstick, a lip-gloss, a sun protection product, a cleansing product, a make-up remover, a cream, or a hair conditioner.

The cosmetic composition can further comprise additional ingredients that are typically used in cosmetics, such as surfactant and preservative.

The invention is further described in the following examples, given by way of illustration, with reference to the figures:

FIG. 1 represents a diagram relating to the evolution of the stress of preblend 1 according to the shear rate applied, the preblend 1 comprising 5% by weight of ethyl cellulose polymer in 95% by weight of dimer diol.

Figure 2:
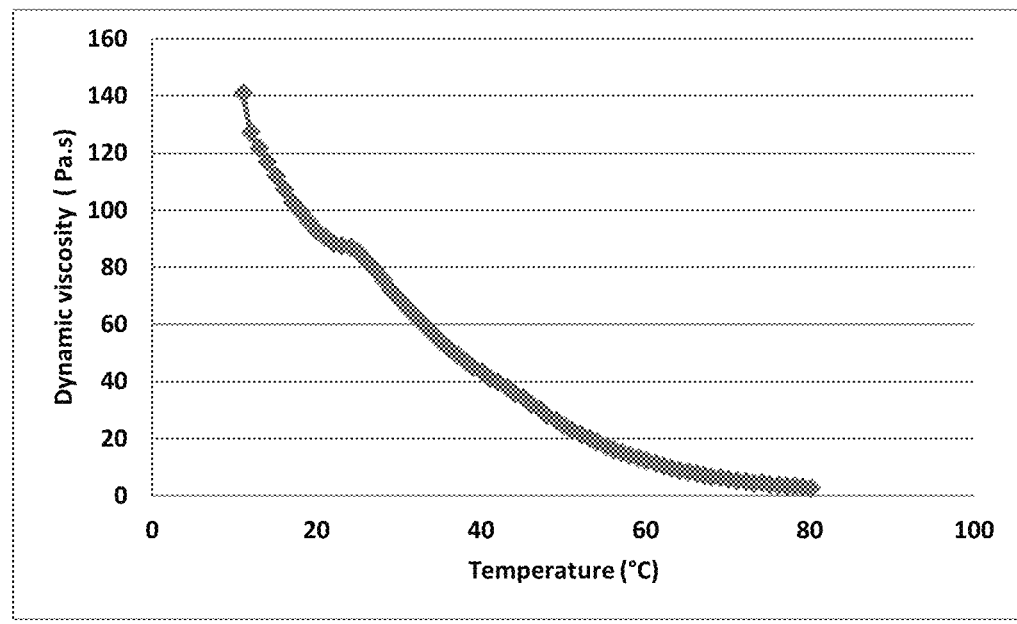

FIG. 2 represents a diagram relating to the evolution of the dynamic viscosity according to the temperature of preblend 1, the preblend 1 comprising 5% by weight of ethyl cellulose polymer in 95% by weight of dimer diol.

MATERIALS USED IN EXAMPLES

Alcohols comprising at least 36 carbon atoms and which are liquid at 25° C.:
dimer diol: Radianol 1990 from Oleon, which is obtained from oleic acid, is a mixture of dimer diol isomers comprising 36 carbon atoms, wherein linear isomers content is of 76 wt % based on the weight of the mixture;

poly(dimer diol), which is the filtrate of distillation of Radianol 1990 from crude dimerization reaction followed by hydrogenation reaction, comprising a mixture of poly(dimer diol), wherein at least 50 wt % of poly(dimer diol) comprise 72 carbon atoms);

isoC36 alcohol, which is a Guerbet alcohol obtained from isostearic alcohol;

Ethyl cellulose polymers:
Ethocel Std. 4;
Ethocel Std. 7;
Ethocel Std. 45;
Ethocel Std.100;
Ethocel Std. 200;

where the number in the product name identifies the viscosity at 25° C. of a solution of 5% by weight of Ethocel in a solvent, based on the weight of the solution, solvent being constituted by 80% toluene and 20% ethanol by weight; all of them being from Dow Chemical Company;

Low viscosity silicone alternatives:
A1: isoamyl laurate: Jolee 7750 from Oleon;
A2: monopropylene glycol diheptanoate: Jolee 7202 from Oleon
A3: triheptanoin: Radia 2375 from Oleon;
A4: isononyl isononanoate: Jolee 7710 from Oleon;
A5: butylene glycol dicaprylate/dicaprate: Jolee 7214 from Oleon.

Example 1

Advantages of the Products According to the Invention (in the Form of Gel-Like Preblends)

1.1 Preparation of Gel-Like Preblends According to the Invention

An alcohol comprising at least 36 carbon atoms and which is liquid at 25° C., was placed in a beaker. While stirring, an ethyl cellulose polymer was added to the alcohol. The preblend was heated up to 150° C. for around 10 minutes under stirring, until complete solubilization of ethyl cellulose polymer to obtain a homogeneous and transparent solution. Then the temperature of the preblend was cooled down to 35° C. at a rate of 0.6° C./min, under slow stirring. A gel-like preblend is then obtained.

Quantities of components used to prepare gel-like preblends are described in Table 1 below:

1.2 Shear-Thinning Property of Gel-Like Preblends

Dynamic viscosities of each product were measured using a Discovery HR-1 Rheometer of TA instruments using a cone plate system, with a cone SST ST 40 MM 2 DEG Smart Swap, an angle of 1:59:50° and a truncation of 53 µm.

For each gel-like preblend, the viscosity was measured 24 hours after its preparation, at 25° C., when the preblend is subjected to a low shear rate going from $0.1\ s^{-1}$ till $300\ s^{-1}$, over a period of 240 s, on the logarithmic scale (values close to zero corresponding to the Newtonian plateau, called "zero shear rate" viscosity), i.e. for which the viscosity is constant The results are shown in Table 2.

TABLE 2

Dynamic viscosities at different shear rates of gel-like preblends according to the invention

| | Dynamic viscosity (mPa · s) at shear rate: | | |
|---|---|---|---|
| | zero shear rate | $10\ s^{-1}$ | $250\ s^{-1}$ |
| Preblend 1 | 1 792 200 | 98 200 | 9 032 |
| Preblend 2 | 3 160 810 | 97 596 | 6 030 |
| Preblend 3 | 1 836 830 | 18 521 | 1 151 |
| Preblend 4 | 670 750 | 109 250 | 28 000 |
| Preblend 5 | 650 000 | 69 100 | 16 250 |
| Preblend 6 | 105 910 | 31 650 | 9 912 |
| Preblend 7 | 6 257 | 4 991 | 3 800 |
| Preblend 8 | 5 400 | 3 767 | 3 040 |
| Preblend 9 | 539 430 | 85 400 | 23 420 |

It can be observed there that the viscosity of the preblend decreases, when the shear rate increases. Gel-like preblends of the invention are shear-thinning.

1.3 Thixotropic Property of Gel-Like Preblends

For this test, the same rheometer as previously described was used. Preblend 1 was subjected to a shear rate corresponding to an increase from $0.1\ s^{-1}$ to $300\ s^{-1}$, followed by a decrease from $300\ s^{-1}$ to $0.1\ s^{-1}$. The established hysteresis loop (FIG. 1) shows the evolution of stress as a function of shear. It can be observed that the downward flow curve is well below the upward flow curve. It can be concluded that the preblend is thixotropic.

1.4 Viscosity-Temperature Relationship of Gel-Like Preblends

For this test, the same rheometer as previously described was used. Preblend 1 was subjected to a shear rate of $10\ s^{-1}$,

TABLE 1

Content of gel-like preblends according to the invention

| | Dimer diol (wt %) | Poly-dimer diol (wt %) | isoC36 alcohol (wt %) | Ethocel Std. 4 (wt %) | Ethocel Std. 7 (wt %) | Ethocel Std. 45 (wt %) | Ethocel Std. 100 (wt %) | Ethocel Std. 200 (wt %) |
|---|---|---|---|---|---|---|---|---|
| Preblend 1 | 95 | | | | | 5 | | |
| Preblend 2 | | 95 | | | | 5 | | |
| Preblend 3 | | | 95 | | | 5 | | |
| Preblend 4 | 90 | | | 10 | | | | |
| Preblend 5 | 95 | | | | 5 | | | |
| Preblend 6 | 97.5 | | | | | | | 2.5 |
| Preblend 7 | 99 | | | | | 1 | | |
| Preblend 8 | 99.7 | | | | | | 0.3 | |
| Preblend 9 | 90 | | 10 | | | | | | under a temperature increasing from 10° C. to 80° C. Dynamic viscosities measured at 50 and 80° C. are gathered in Table 3.

TABLE 3

Dynamic viscosity of gel-like preblend 1 at different temperatures at a shear rate of 10 s$^{-1}$

| | Dynamic Viscosity at 10 s$^{-1}$ (mPa · s) | |
|---|---|---|
| | 50° C. | 80° C. |
| Preblend 1 | 25 083 | 3 746 |

The temperature profile (FIG. 2) shows that high dynamic viscosity is going down with temperature. At a temperature of 60° C. and above, the preblend can be easily casted or pumped.

Example 2

Synergistic Effect of the Product According to the Invention on Viscosity of Various Low Viscosity Silicone Alternatives 2.1 Preparation of the Compositions According to the Invention
a) With the Use of the Gel-Like Preblend
To prepare compositions 1 and 3, 50 g of A1 and A2 were respectively placed in a reactor. While stirring, 50 g of the gel-like preblend 1 heated at a temperature comprised between 40 and 60° C., were added to each low viscosity silicone alternative.
b) Without the Use of the Gel-Like Preblend
To prepare compositions 2 and 4, 50 g of respectively A1 and A2 were mixed in a reactor at room temperature with 47.5 g of the alcohol. While stirring, 2.5 g of ethycellulose polymer were added to the mixture, which was then heated at 150° C. for 10 min until complete transparency.
The composition is then cooled down to 35° C. slowly at a rate of 0.6° C./min under slow stirring.

2.2 Preparation of Comparative Compositions
To prepare comparative compositions 1 and 3, 2.5 g of ethycellulose polymer were added to 97.5 g of respectively A1 and A2 very slowly under constant stirring at room temperature. The temperature is increased at 150 ° C. while stirring at low speed. The comparative compositions are then cooled down at a rate of 0.6° C./min under slow stirring until 35° C.
To prepare comparative compositions 2 and 4, 47.5 g of the alcohol were added to 52.5 g of respectively A1 and A2 at room temperature under stirring.

2.3 Thickening Effect of the Product According to the Invention on Low Viscosity Silicone Alternatives
Dynamic viscosities were measured according to the method described in Example 1.2.
Results obtained for each low viscosity silicone alternative and composition at the Newtonian plateau, for which the viscosity is constant, are gathered in Table 4 below.

TABLE 4

Dynamic viscosities at 25° C. of low viscosity silicone alternatives, comparative compositions and compositions according to the invention

| | A1 (wt %) | A2 (wt %) | Ethocel Std. 100 (wt %) | Dimer diol (wt %) | Preblend 1 (wt %) | Dynamic viscosity (mPa · s) at zero shear rate |
|---|---|---|---|---|---|---|
| A1 | 100 | | | | | 4.7 |
| A2 | | 100 | | | | 6 |
| Comparative composition 1 | 97.5 | | 2.5 | | | 6 (composition not homogeneous) |
| Comparative composition 2 | 52.5 | | | 47.5 | | 60 |
| Comparative composition 3 | | 97.5 | 2.5 | | | 340 |
| Comparative composition 4 | | 52.5 | | 47.5 | | 60 |
| Composition 1 | 50 | | | | 50 | 1850 |
| Composition 2 | 50 | | 2.5 | 47.5 | | 1450 |
| Composition 3 | | 50 | | | 50 | 1650 |
| Composition 4 | | 50 | 2.5 | 47.5 | | 1090 |

As can be seen, dynamic viscosities of compositions according to the invention are much higher than dynamic viscosities of corresponding comparatives compositions comprising the same low viscosity silicone alternative with ethyl cellulose polymer or with dimer diol.

Moreover, the combination of alcohol comprising at least 36 carbon atoms and which is liquid at 25° C., and ethyl cellulose polymer, has a synergistic effect on the viscosity of low viscosity silicone alternatives, as demonstrated by comparison of viscosity values of comparative compositions 1 and 2 with any one of compositions 1 and 2, and by comparison of viscosity values of comparative compositions 3 and 4 with any one of compositions 3 and 4.

Example 3

Shear-Thinning Property of Compositions According to the Invention 3.1 Preparation of Compositions 5-9 According to the Invention
Compositions 5-9 were prepared according to method described in Example 2.1 a) using quantities and components described in Table 5.

TABLE 5

Content of compositions 5-8 according to the invention

| | A1 (wt %) | A2 (wt %) | A3 (wt %) | A4 (wt %) | A5 (wt %) | Preblend 1 (wt %) | Preblend 3 (wt %) |
|---|---|---|---|---|---|---|---|
| Composition 5 | | | 50 | | | 50 | |
| Composition 6 | | | | 50 | | 50 | |
| Composition 7 | | 50 | | | | | 50 |
| Composition 8 | 80 | | | | | 20 | |
| Composition 9 | | | | | 50 | 50 | |

3.2 Shear-Thinning Effect of the Product According to the Invention on Low Viscosity Silicone Alternatives Dynamic viscosities at different shear rates were determined according to method described in Example 1.2.

Results obtained for each composition are gathered in Table 6 below:

TABLE 6

Dynamic viscosities at different shear rate

| | Dyn. viscosity (mPa · s) at shear rate: | | |
|---|---|---|---|
| | Zero shear rate | $10\ s^{-1}$ | $250\ s^{-1}$ |
| Composition 1 | 1850 | 1300 | 800 |
| Composition 2 | 1450 | 1104 | 757 |
| Composition 3 | 1650 | 1494 | 1017 |
| Composition 4 | 1090 | 992 | 805 |
| Composition 5 | 2816 | 2655 | 1535 |
| Composition 6 | 1987 | 1666 | 923 |
| Composition 7 | 880 | 463 | 345 |
| Composition 8 | 80 | 51 | 38 |
| Composition 9 | 2644 | 2403 | 1337 |

It can be observed that the viscosity of the composition according to the invention decreases when the shear rate increases. Compositions of the present invention are shear-thinning.

Example 4

Comparative Preblend and Comparative Compositions

4.1 Comparative Preblend

Comparative preblend 1 was prepared as described in Example 1.1 using 5 g of cyclohexanol and 95 g of Ethocel Std. 100. The comparative preblend presents a dynamic viscosity at zero shear rate of 30800 mPa·s.

4.2 Comparative Composition

Comparative composition 1 was prepared following method described in Example 2.1 a) mixing 50 wt % of comparative preblend 1 with 50 wt % of isoamyl laurate (A1).

The dynamic viscosities at different shear rates of this comparative composition are presented in Table 7.

TABLE 7

Dynamic viscosities at different shear rates of comparative composition 1

| | Dyn. viscosity (mPa · s) at shear rate: | | |
|---|---|---|---|
| | Zero shear rate | $10\ s^{-1}$ | $250\ s^{-1}$ |
| Comparative composition 1 | 340 | 330 | 287 |

The invention claimed is:

1. A product comprising
    an alcohol comprising at least 36 carbon atoms and which is liquid at 25° C. and atmospheric pressure, wherein the alcohol is a Guerbet alcohol, dimer diol, or a poly (dimer diol), and
    an ethyl cellulose polymer,
  as a combined preparation for simultaneous or separate use, wherein the weight ratio (alcohol comprising at least 36 carbon atoms and which is liquid at 25° C. and atmospheric pressure)/(ethyl cellulose polymer) is from 6:1 to 499:1.

2. A process for preparing a gel-like preblend comprising the following steps:
    i) mixing an alcohol comprising at least 36 carbon atoms and which is liquid at 25° C. and atmospheric pressure, with an ethyl cellulose polymer to obtain a preblend, wherein the weight ratio (alcohol comprising at least 36 carbon atoms and which is liquid at 25° C. and atmospheric pressure)/(ethyl cellulose polymer) is from 6:1 to 499:1;
    ii) heating the preblend under stirring at a temperature higher than the glass transition temperature of the ethyl cellulose polymer; and
    iii) cooling down the preblend under stirring to obtain a gel-like preblend.

3. A method for increasing the viscosity of a low viscosity silicone alternative, comprising mixing an alcohol comprising at least 36 carbon atoms and which is liquid at 25° C. and atmospheric pressure and an ethyl cellulose polymer individually and/or successively with a low viscosity silicone alternative, wherein the low viscosity silicone alternative is selected from the group consisting of isoamyl laurate, propylene glycol diheptanoate, isononyl isononanoate, trieptanoin, coco-caprylate/caprate, ethyl macadamiate, octyldodecyl olivate, diisoamyl sebacate, butylene glycol dicaprylate/dicaprate, isodecyl neopentanoate, methylheptyl isostearate, isodecyl neopentanoate, dicaprylyl ether, dicaprylyl carbonate, propylheptyl caprylate, and mixtures thereof.

4. A composition comprising of:
    a low viscosity silicone alternative selected from the group consisting of isoamyl laurate, propylene glycol diheptanoate, isononyl isononanoate, triheptanoin, coco-caprylate/caprate, ethyl macadamiate, octyldodecyl olivate, diisoamyl sebacate, butylene glycol dicaprylate/dicaprate, methylheptyl isostearate, isodecyl neopentanoate, dicaprylyl ether, dicaprylyl carbonate, propylheptyl caprylate, and mixtures thereof;

an alcohol comprising at least 36 carbon atoms and which is liquid at 25° C. and atmospheric pressure, wherein the alcohol is a Guerbet alcohol, dimer diol, or a poly (dimer diol); and an ethyl cellulose polymer.

5. The composition of claim 4, wherein:

the low viscosity silicone alternative is selected from the group consisting of isoamyl laurate, propylene glycol diheptanoate, and mixtures thereof; and the alcohol comprising at least 36 carbon atoms and which is liquid at 25° C. and atmospheric pressure is a dimer diol prepared from oleic acid or oleic alcohol.

6. A process for preparing the composition of claim 4, comprising mixing the alcohol comprising at least 36 carbon atoms and which is liquid at 25° C. and atmospheric pressure, the ethyl cellulose polymer and the low viscosity silicone alternative.

7. A cosmetic composition comprising the product of claim 1, an active ingredient and/or a pigment or a colorant.

8. The method of claim 3, wherein the method comprises mixing the alcohol with the low viscosity silicone alternative, and then mixing the ethyl cellulose polymer in.

9. The method of claim 3, wherein the method comprises blending the alcohol and the ethyl cellulose polymer together, and then mixing the low viscosity silicone alternative in.

10. The product of claim 1, wherein the alcohol and ethyl cellulose polymer are combined as a premix and the product is thixotropic and shear-thinning.

11. A cosmetic composition comprising the composition of claim 4, an active ingredient and/or a pigment or a colorant.

12. A cosmetic composition comprising the composition of claim 5, an active ingredient and/or a pigment or a colorant.

13. A cosmetic composition comprising the product of claim 10, an active ingredient and/or a pigment or a colorant.

* * * * *